(12) United States Patent
Pisarenko et al.

(10) Patent No.: US 12,448,814 B2
(45) Date of Patent: Oct. 21, 2025

(54) STATIONARY LOCKING MODULE FOR ELECTRICAL VEHICLES OF INDIVIDUAL MOBILITY

(71) Applicant: STRIM MOBILITY SAS, Strasbourg (FR)

(72) Inventors: Sergey Pisarenko, Moscow (RU); Vasilii Bykov, Moscow (RU); Denis Medvedev, Saint-Petersburg (RU)

(*) Notice: Subject to any disclaimer, the term of this patent is extended or adjusted under 35 U.S.C. 154(b) by 0 days.

(21) Appl. No.: 18/028,750

(22) PCT Filed: Sep. 25, 2020

(86) PCT No.: PCT/EP2020/000165
§ 371 (c)(1),
(2) Date: Mar. 27, 2023

(87) PCT Pub. No.: WO2022/063383
PCT Pub. Date: Mar. 31, 2022

(65) Prior Publication Data
US 2023/0332434 A1 Oct. 19, 2023

(51) Int. Cl.
*E05B 47/00* (2006.01)
*B62H 5/00* (2006.01)

(52) U.S. Cl.
CPC .......... *E05B 47/0001* (2013.01); *B62H 5/00* (2013.01); *E05B 2047/0054* (2013.01); *E05B 2047/0057* (2013.01); *E05B 2047/0072* (2013.01)

(58) Field of Classification Search
CPC .............. B62H 5/00; E05B 2047/0054; E05B 2047/0057; E05B 2047/0072
See application file for complete search history.

(56) References Cited

U.S. PATENT DOCUMENTS

| 10,093,379 B2* | 10/2018 | Hines ............... H04M 1/724098 |
| 2018/0350175 A1* | 12/2018 | Fan ..................... G07C 9/00309 |
| 2020/0023917 A1* | 1/2020 | Hu ............................ E05B 71/00 |
| 2020/0180718 A1* | 6/2020 | Foley ..................... B62J 50/225 |

FOREIGN PATENT DOCUMENTS

| CN | 105625830 A | * | 6/2016 |
| WO | 2020123337 A1 | | 6/2020 |

OTHER PUBLICATIONS

International Search Report of Jun. 11, 2021 for PCT/EP2020/000165.

* cited by examiner

*Primary Examiner* — Mark A Williams
(74) *Attorney, Agent, or Firm* — Maxwell L Minch Esq. PA; Maxwell L. Minch

(57) ABSTRACT

The invention relates to stationary locking devices for electrical vehicles of individual mobility and can be applied for transportation systems. The technical result, which the invention is aimed at, is to provide the possibility of powering the electric locking mechanism from the on-board network of an electric vehicle of individual mobility that is blocked by a stationary locking module. The essence of the invention is a stationary locking module for electric vehicles of individual mobility, comprising an electrical locking mechanism, wherein this stationary locking module has a contact element for powering the electric locking mechanism from the on-board network of the lockable electric vehicle of individual mobility.

12 Claims, 4 Drawing Sheets

STATIONARY LOCKING MODULE FOR ELECTRICAL VEHICLES OF INDIVIDUAL MOBILITY

Figure 1:
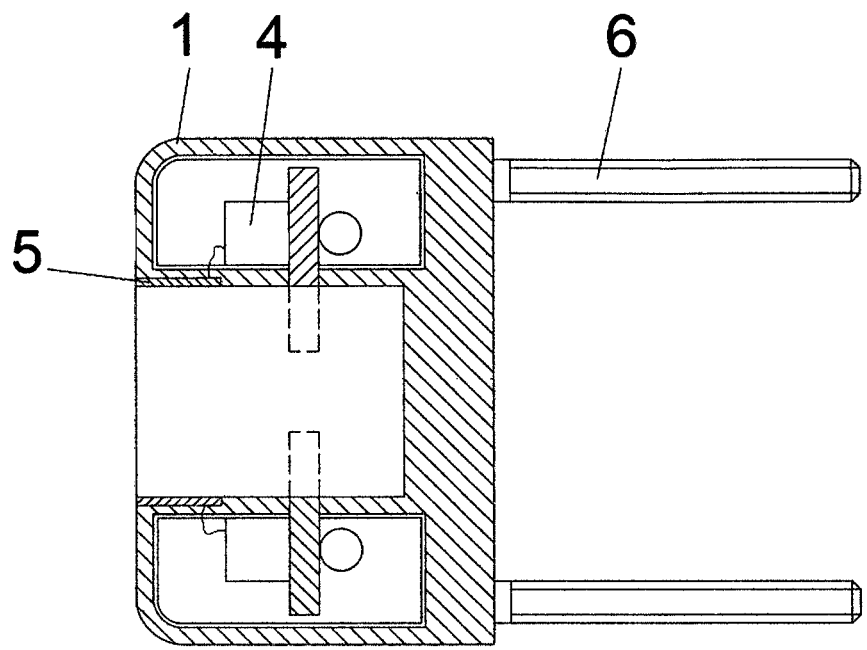

The invention relates to stationary locking devices for electrical vehicles of individual mobility and can be applied for transportation systems.

A stationary blocking component of the personal mobility device rental system mounted onto the base station of the rental system, where power supply of the blocking component is provided by the rental system base station is known in the art [KR20110007466, published: 24 Jan. 2011 r., IPC: B62H5/00; E05B71/00; G06Q50/30].

A stationary locking device for bicycles with electronic control, comprising an electromechanical drive and a locking element, intended for use in mechanisms for securing bicycles in automated bicycle rental systems, wherein the power of the electronic controller and the electromechanical drive is provided from the station of the vehicle rental system is known for those of ordinary skill in the art [WO2019117742, publication date: Jun. 20, 2019, IPC: E05B9/02].

A common drawback of the known devices is their constrained functional due to the fact that the stationary blocking device elements are absolutely energetically dependent on vehicle rental system stations, in consequence of which they cannot be utilized separately thereof.

As a prototype an electronic blocking device for two-wheeled personal vehicles is chosen, which is composed of an electric locking mechanism and a power module connected thereto represented with a storage battery [EP3434850, publication date: 30 Jan. 2019 r., IPC: B62H5/14; E05B47/00; E05B63/00].

An advantage of the prototype is the possibility of using it separately from the stations of rental systems due to the fact that the electronic blocking device is equipped with a power module in the form of a storage battery, which can provide autonomous operation of the electronic blocking device.

However, a disadvantage of the prototype is low reliability of the electronic blocking device when it is placed separately from the rental system stations, due to the fact that the autonomy of the electronic blocking device is provided due to power from the built-in rechargeable battery, which has a significant drawback, which consists in the need for its frequent charging, moreover rechargeable batteries require replacement if they fail due to their short service life, which makes it necessary to conduct operational control of the electronic locking device in order to charge or replace the battery, as a result, this leads to the need to place the electronic locking device near stationary power sources, the same rental stations or service points for such devices, which in turn limits the functionality of the device. At the same time, the refusal to use built-in rechargeable batteries or the refusal to power such devices from stationary rental points can lead to the impossibility of activating the electric locking mechanism and, as a result, to the loss of the ability to block or unblock an electric vehicle of individual mobility. However, it is possible to obtain power for the operation of the electric locking mechanism directly from an on-board network of the electric vehicle of individual mobility itself, but the functionality of existing locking devices for electric vehicles of individual mobility does not provide the possibility of its implementation.

The technical problem to be solved by the invention is the need to expand the functionality of the stationary locking module for electric vehicles of individual mobility.

The technical result, which the invention is aimed at, is to provide the possibility of powering the electric locking mechanism from the on-board network of an electric vehicle of individual mobility that is blocked by a stationary locking module.

An additional technical result, to which the invention is directed, consists in increasing the reliability of the stationary locking module by ensuring its operation from the on-board network of an electric vehicle of individual mobility and eliminating the need to use its own power source.

A further technical result, to which the invention is directed, is to reduce the labor intensity of servicing the stationary locking module for electric vehicles of individual mobility.

A still further technical result, to which the invention is directed, is to improve the weight and size characteristics of the stationary locking module for electric vehicles of individual mobility.

The concept of the invention is as follows.

The stationary locking module for electric vehicles of individual mobility includes an electric locking mechanism. In contrast to the prototype, the stationary locking module has a contact element for powering the electric locking mechanism from the on-board network of the lockable electric vehicle of individual mobility.

The stationary locking module provides blocking of an electric vehicle of individual mobility, thereby preventing unauthorized access to its operation by unauthorized persons.

An electric vehicle for personal mobility is a small-sized vehicle with an electric drive, which partially or completely keeps it moving. An example of an electric vehicle for individual mobility is an electric scooter, electric bike, gyro scooter, etc.

The on-board network of an electric vehicle of individual mobility includes a set of its power sources and other electronic components which ensure the functioning of the electronic components of an electric vehicle of individual mobility.

Said electric locking mechanism secures the counter locking element of an electric vehicle of individual mobility in the stationary locking module. The electric locking mechanism can be represented by a latch and a drive connected thereto. The latch is a movable element that can move in two positions "locked" and "unlocked", thereby providing the ability to insert and remove the counter locking element of an electric vehicle of individual mobility from the stationary locking module. The latch can be made in the form of a pin (crossbar), an L-shaped swivel hook, a spring-loaded ball, etc. The latch is driven by an electric drive, which can be made in the form of an electromechanical drive, an electric motor, a magnetic pusher, etc.

The contact element is configured to power the electric locking mechanism from the on-board network of an electric vehicle of individual mobility due to the flow of electric current through it from the control unit of the electric vehicle to the drive of the electric locking mechanism. Thus, blocking of the vehicle can be provided in the module by transmitting current of one characteristic from the control unit of the electric vehicle, and unlocking can be provided by transmitting current of another characteristic. The contact element can be located on the body of the stationary locking module or on the electrical locking mechanism, for example on the latch. The contact element can also be presented in the form of a housing or a retainer made of a conductive material. The contact element is electrically connected to the power supply terminal of the electric locking mechanism. In this case, the closing of the circuit can be provided by an additional contact element, which can be represented by a conductive component of the stationary locking module connected to another terminal of the electrical locking mechanism. The contact element can be made in the form of a plate or in the form of a round or square conductor made of metals such as copper, aluminum, nichrome alloys, etc. At the same time, due to the fact that the contact element is configured to power the electric locking mechanism directly from the on-board electrical network for the electric vehicle of individual mobility, the need to use its own power source is eliminated, as a result of which the design of the device is simplified, thereby increasing its reliability and improving weight and size characteristics. In addition, due to the exclusion of its own power source from the design of the device, the need to charge or replace it is eliminated, thereby reducing the labor intensity of servicing the stationary locking module.

The electric locking mechanism may include a controller that receives and processes a signal, including for blocking and unlocking the electric locking mechanism supplied by the on-board network of an electric vehicle of individual mobility, which simplifies interaction with a stationary locking module. The controller can also transmit control signals to the electric locking mechanism. To receive signals from an electric vehicle of individual mobility and send control signals to the electric locking mechanism, the controller can be electrically connected to the contact element and the electric locking mechanism. The controller can be an integrated circuit, a microprocessor, or a microcontroller mounted on a printed circuit board.

Additionally, the controller can be configured to transmit a GPS signal to determine the location of the stationary locking module, wherefore it can contain a GPS module. In this case, the controller can be designed in such a way that the signal transmission is carried out both throughout the entire blocking session of an electric vehicle of individual mobility, and at certain intervals during the blocking session, for example, once a day, once a week, once a month, etc. etc.

Additionally, the controller can be configured to transmit and receive a GSM signal in order to transmit data about the current state of the stationary locking module to the user's electronic device, for which it can contain a GSM module. In this case, the controller can be designed in such a way that the signal transmission is carried out at the time of blocking or unlocking of the electric vehicle of individual mobility.

Additionally, the controller can be configured to identify an electric vehicle of individual mobility, for which it can contain an identification module. The identification module can be represented by an RFID module, a magnetic sensor for recognizing magnetic tags, an infrared port, etc. The identification module can be configured to transmit a signal to the controller via wired and wireless communication, while the controller can be configured to identify the connected electric vehicle of individual mobility and can block it.

Additionally, the controller may contain means of sound and/or light indication, represented by a speaker or LEDs electrically connected thereto. The stationary locking module for electric vehicles of individual mobility may contain a housing that protects the components of the stationary locking module, as well as their fixation inside any of these components can be mounted, for example, in a building wall. The body can have a different shape, convenient for mounting, for example, round, square, hexagonal shape, etc. The body can be made moisture-proof or anti-vandal and have holes for light and sound indication means. The housing may contain fasteners that provide the possibility of mounting the stationary locking module on structural elements (for example, within a building wall, to structures of rental systems, as well as to structures specially designed for these purposes). Fasteners can be represented by protrusions with guide holes, pins, metal rods, etc. The body can be made of any known structural materials such as aluminum, impact-resistant plastic, steel, etc.

The invention can be implemented using known means, materials and technologies, which indicates that the invention meets the criterion of «industrial applicability" of patentability.

The invention is characterized by a set of essential features previously unknown from the prior art, characterized in that the stationary locking module contains a contact element for powering the electric locking mechanism from the on-board network of a locked electric vehicle of individual mobility, which enables the stationary locking module to receive electric current from the on-board network of a locked electric vehicle of individual mobility by means of a contact element, as a result of which it becomes possible to activate the electric locking mechanism due to the on-board network of an electric vehicle of individual mobility without any need to use its own power source in the stationary locking module, thereby achieving the technical result of providing the possibility of powering the electric locking mechanism from on-board network of a blockable by stationary locking module of an electric vehicle of individual mobility, thereby expanding the functionality of the stationary locking device for electric vehicles of individual mobility.

The invention is characterized by a set of essential features previously unknown from the prior art, which testifies to its compliance with the "novelty" criterion of patentability.

A stationary locking device is known from the prior art, which can be used separately from the stations of the personal mobility equipment rental system due to the fact that it has its own power source in the form of a built-in rechargeable battery, the energy of which is supplied to the electronic elements of the stationary locking device, but it is not known from the prior art a stationary locking device, the electric locking mechanism of which would be powered only by the energy of the power sources of the on-board network of an electric vehicle of individual mobility.

The presence of a new essential feature, previously unknown from the prior art, indicates the compliance of the invention with the "inventive step" criterion of patentability.

The invention is illustrated by the following figures.

FIG. 1—The stationary locking module with a square body, the electric locking mechanism is represented by a latch bolt, sectional side view.

Figure 2:
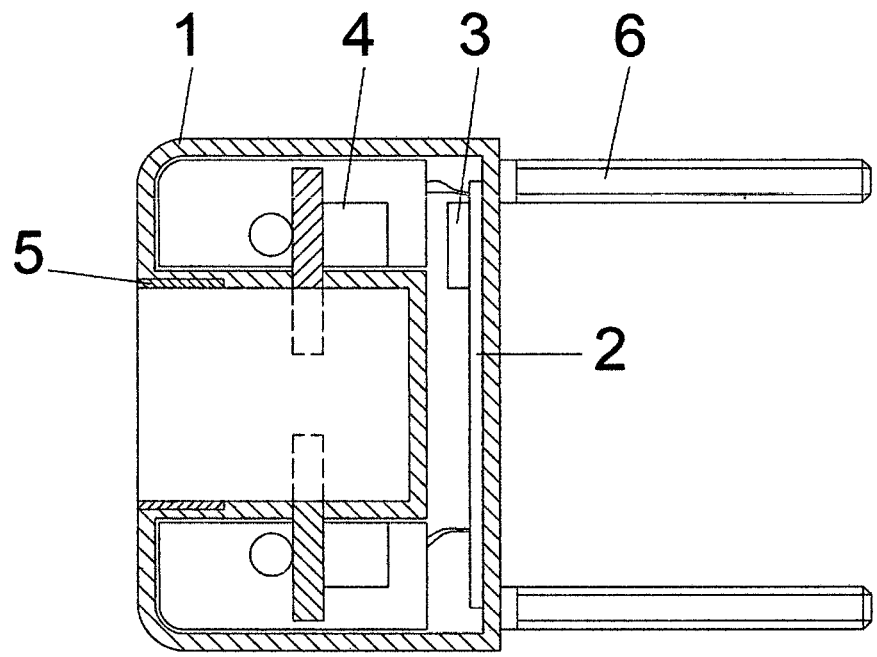

FIG. 2—The stationary locking module with a square body and a controller, the electric locking mechanism is represented by a latch bolt, sectional side view.

Figure 3:
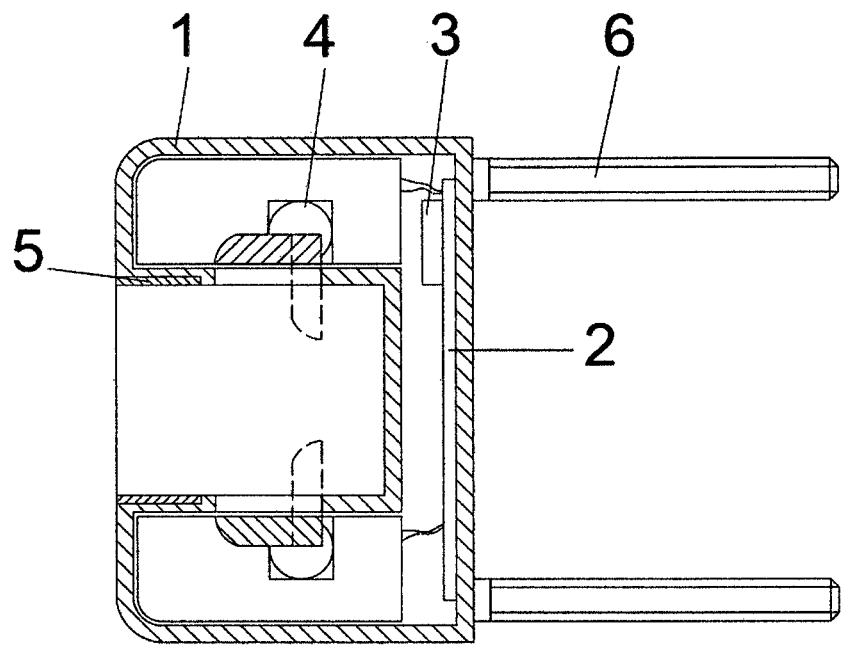

FIG. 3—The stationary locking module with a square body and a controller, the electric locking mechanism is represented by a rotary lock, sectional side view.

Figure 4:
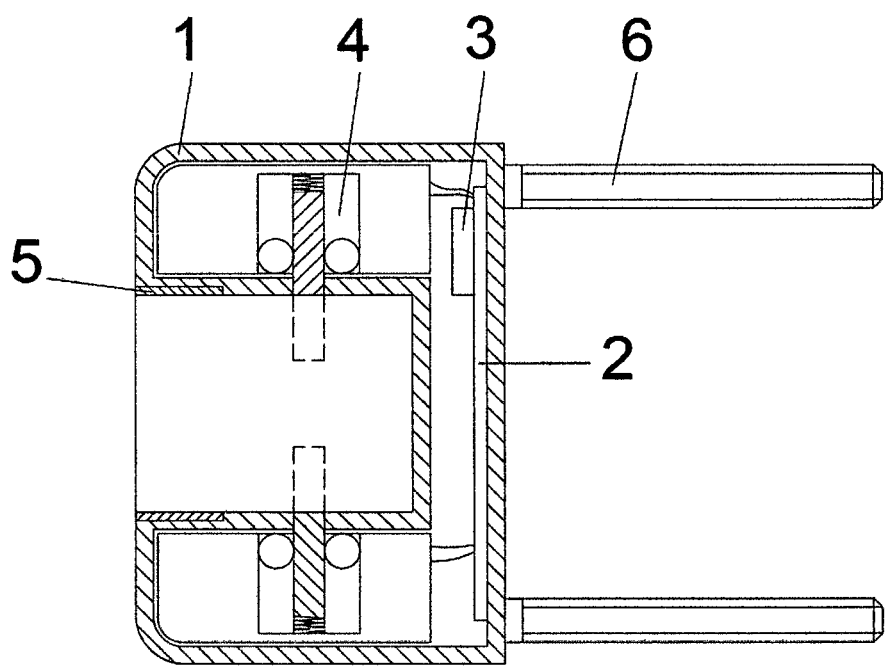

FIG. 4—The stationary locking module with a square body and a controller, the electric locking mechanism is represented by a spring-loaded latch, sectional side view.

Figure 5:
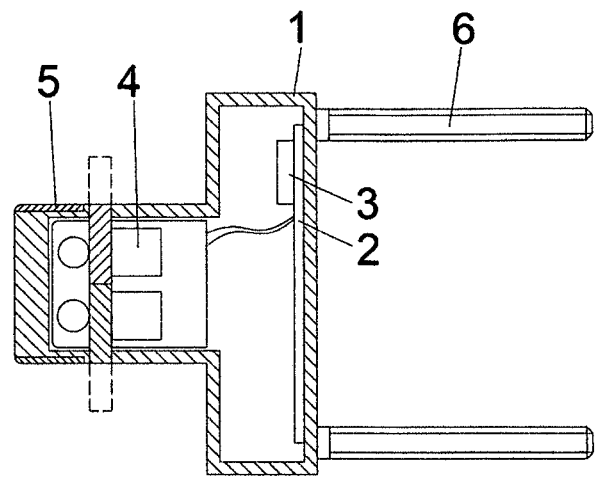

FIG. 5—The stationary locking module with a round body and a controller, the electric locking mechanism is represented by a latch bolt, sectional side view.

Figure 6:
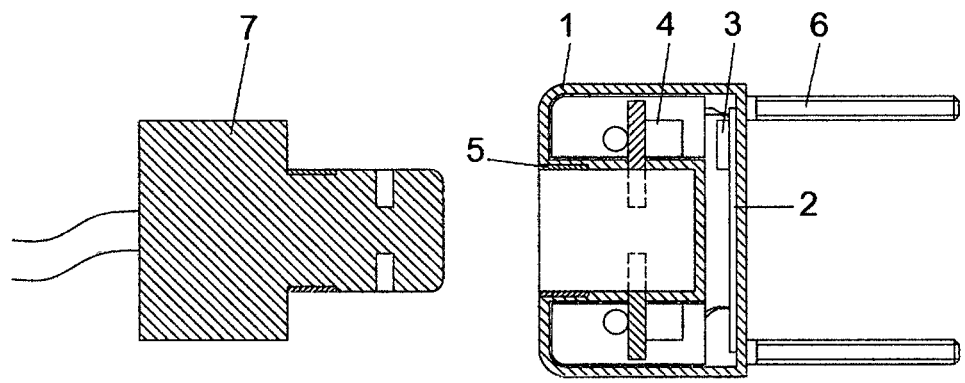

FIG. 6—The stationary locking module and a counter locking element of a lockable electric vehicle of individual mobility at the stage of connection, sectional side view.

Figure 7:
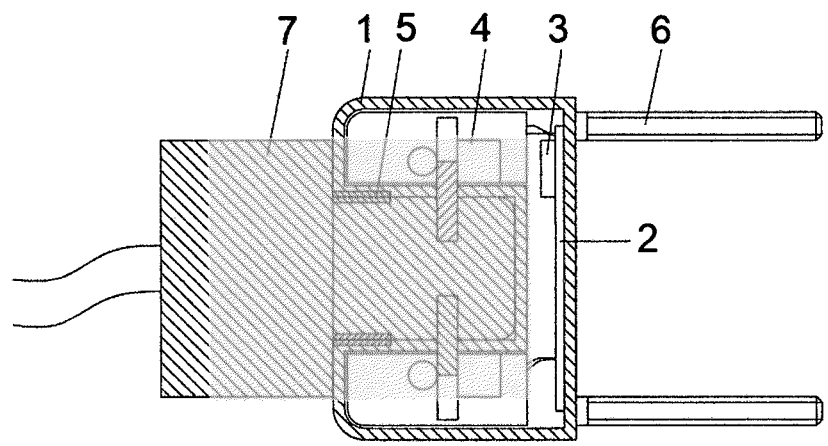

FIG. 7—The stationary locking module and a counter locking element of a lockable electric vehicle of individual mobility in a locked state, sectional side view.

Figure 8:
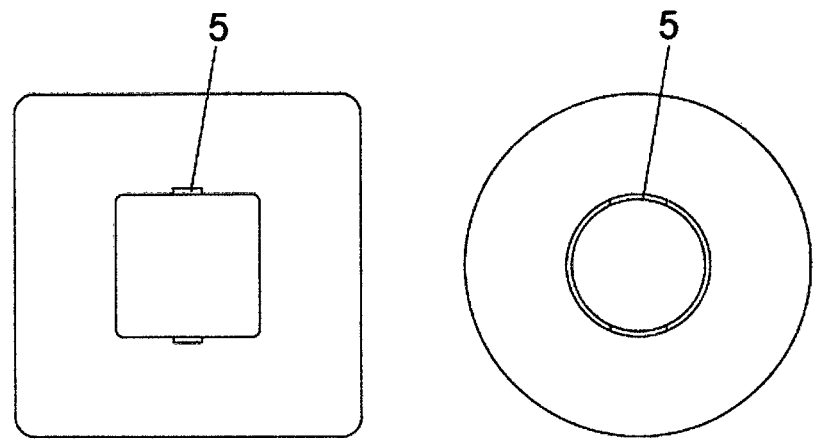

FIG. 8—Execution of the stationary locking module in a square and round body, front view.

Figure 9:
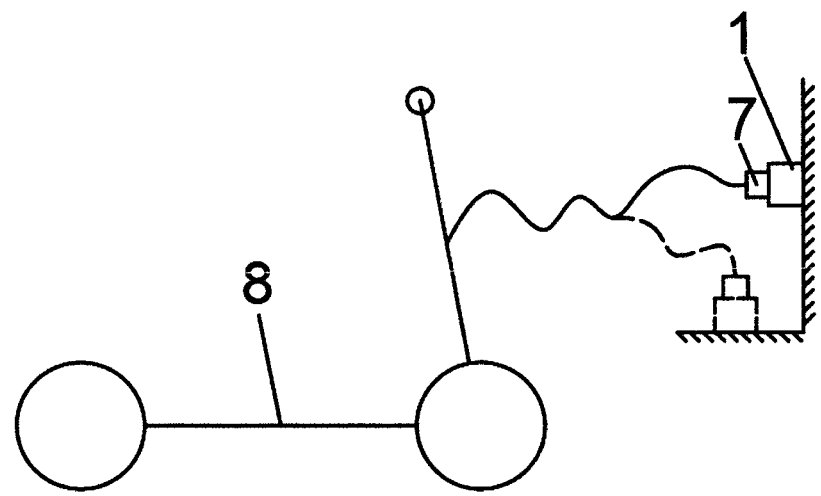

FIG. 9—An electric vehicle for individual mobility connected to the stationary locking module, general view.

To illustrate the possibility of implementation and a more complete understanding of the essence of the invention, an embodiment is presented below, which can be changed or supplemented in any way, and the present invention is in no way limited to the presented embodiment.

The stationary locking module for electric vehicles of individual mobility contains a housing 1, a printed circuit board 2, on which the controller 3 of the electric locking mechanism, GPS, GSM, RFID modules (not shown in the figures) are mounted, and a drive 4, a contact group 5 is installed on the housing 1, which are electrically connected with a printed circuit board 2 and, respectively, with a controller 3. The housing also contains pins 6 for installing and fixing the stationary locking module on the surface.

The invention works as follows.

The stationary locking module for electric vehicles of individual mobility is installed and secured by means of pins 6 on a vertical or horizontal surface, which can be represented by the wall of a house, a stop, a special station for renting vehicles, etc. The user, using his smartphone, discovers a free stationary locking module through a specialized card application, the location of which was transmitted to the application by the built-in GPS module during the last blocking session of an electric vehicle of individual mobility. The operation of the GSM module is implemented in a similar way, which allows the user to track the free listable locking module. To block an electric vehicle of individual mobility, the response locking element 7 located on an electric vehicle 8 of individual mobility is installed by the user in, a stationary locking module by placing it in the connector of the housing 1. Then, using the interface of the electric vehicle of individual mobility, the user or automatically without any need for any action on the part of the user «block" function is activated, by reading the unique serial number of the personal mobility device by the controller 3 of the stationary locking device through the contact group 5, after which an electric current is supplied from the on-board network of the electric vehicle of individual mobility through the wire. Electric current flows through the contact group 5 and starts to power the controller 3, which in turn identifies the connected electric vehicle of individual mobility by reading the vehicle contact tag by the RFID module and starts transmitting the control signal to the actuator 4. The actuator 4 moves to the "lock" position, thereby blocking the counter-locking element 7 in the body of the stationary locking module. In this mode, the stationary locking module prevents unauthorized access to the operation of the electric vehicle of individual mobility by unauthorized persons.

To unlock an electric vehicle of individual mobility, the user activates the "unlock" function using the interface, after which the controller 3, in a similar manner to the blocking process, carries out the process of transferring the drive 4 to the unlocking position, thereby releasing the counter locking element 7 located on the electric vehicle 8 of individual mobility.

Thus, the technical result is achieved, which consists in providing the possibility of powering the electric locking mechanism from the on-board network of an electric vehicle of individual mobility blocked by the stationary locking module, thereby expanding the functionality of the stationary locking device for electric vehicles of individual mobility.

The invention claimed is:

1. A stationary locking module for electric vehicles of individual mobility, said stationary locking module comprising:
    an electric locking mechanism configured to engage with and retain a counter locking element of the electric vehicle to prevent unauthorized removal;
    wherein said electric locking mechanism comprises an actuator operable to move between a locked position and an unlocked position; and
    wherein said electric locking mechanism further comprises a contact element electrically connectable to an on-board power supply of the electric vehicle, such that electric current is received through said contact element to activate said actuator and operate said electric locking mechanism.

2. The stationary locking module according to claim 1, wherein said stationary locking module further comprises a housing.

3. The stationary locking module according to claim 2, wherein said housing is made moisture-proof or vandal-proof.

4. The stationary locking module according to claim 2, wherein said contact element is located on said housing.

5. The stationary locking module according to claim 4, wherein said contact element is made in the form of a metal plate.

6. The stationary locking module according to claim 2, wherein said housing contains one or more fasteners for mounting said stationary locking module to said electric vehicle of individual mobility.

7. The stationary locking module according to claim 1, wherein said electrical locking mechanism further comprises a controller.

8. The stationary locking module according to claim 7, wherein said controller is configured to receive signals from an electric vehicle of individual mobility and send control signals to the electric locking mechanism.

9. The stationary locking module according to claim 7, wherein said controller is configured to identify said electric vehicle of individual mobility.

10. The stationary locking module according to claim 7, wherein said controller is configured to transmit one or more GPS signal.

11. The stationary locking module according to claim 7, wherein said controller is configured to transmit and receive one or more Global System for Mobile Communications (GSM) signal.

12. The stationary locking module according to claim 7, wherein said controller further comprises one or more means for transmitting one or more sound or light indication, and said housing further comprises one or more openings for allowing said light indication to be seen from outside the housing.

* * * * *